United States Patent
Kling et al.

(10) Patent No.: US 8,042,866 B2
(45) Date of Patent: Oct. 25, 2011

(54) VEHICLE OCCUPANT RESTRAINT BELT SYSTEM

(75) Inventors: Anders Kling, Torslanda (SE); Anders Axelson, Torslanda (SE); Lars-Erik Andersson, Västra Frölunda (SE)

(73) Assignee: Volvo Car Corporation, Gothenburg (SE)

( * ) Notice: Subject to any disclaimer, the term of this patent is extended or adjusted under 35 U.S.C. 154(b) by 231 days.

(21) Appl. No.: 12/464,425

(22) Filed: May 12, 2009

(65) Prior Publication Data

US 2009/0284067 A1    Nov. 19, 2009

(30) Foreign Application Priority Data

May 14, 2008 (EP) .................................. 08156159

(51) Int. Cl.
*B60N 2/42* (2006.01)

(52) U.S. Cl. ................ 297/216.1; 297/216.13; 297/470; 280/801.1

(58) Field of Classification Search ............... 297/216.1, 297/216.13, 470, 473, 474, 479, 480, 484; 280/801.1, 801.2, 804, 808
See application file for complete search history.

(56) References Cited

U.S. PATENT DOCUMENTS

| | | | | |
|---|---|---|---|---|
| 3,899,042 A | * | 8/1975 | Bonar | 297/487 |
| 4,681,345 A | * | 7/1987 | Swartout | 280/801.1 |
| 4,919,488 A | * | 4/1990 | Deegener et al. | 297/468 |
| 5,261,696 A | * | 11/1993 | Hamaue | 280/802 |
| 5,681,081 A | * | 10/1997 | Lindner et al. | 297/216.13 |
| 5,749,601 A | * | 5/1998 | Knoll et al. | 280/805 |
| 6,145,881 A | * | 11/2000 | Miller et al. | 280/806 |
| 6,267,409 B1 | * | 7/2001 | Townsend et al. | 280/801.1 |
| 6,276,721 B1 | * | 8/2001 | Romeo | 280/808 |
| 6,485,058 B1 | * | 11/2002 | Kohlndorfer et al. | 280/808 |
| 6,655,744 B2 | * | 12/2003 | Petri et al. | 297/478 |
| 6,926,357 B2 | * | 8/2005 | Furukawa | 297/216.1 |
| 7,131,668 B2 | * | 11/2006 | Go | 280/808 |
| 7,195,315 B2 | * | 3/2007 | Rikhof | 297/256.16 |
| 7,540,537 B2 | * | 6/2009 | Bell | 280/806 |
| 2004/0012242 A1 | | 1/2004 | White | |

FOREIGN PATENT DOCUMENTS

| | | |
|---|---|---|
| DE | 10 2004 017643 A1 | 11/2005 |
| FR | 2 577 492 A1 | 8/1986 |
| FR | 2 655 300 A1 | 6/1991 |

OTHER PUBLICATIONS

European Search Report for European Patent Application No. EP 08 15 6159 mailed Oct. 28, 2008.

* cited by examiner

*Primary Examiner* — Laurie Cranmer
(74) *Attorney, Agent, or Firm* — Brooks Kushman, P.C.

(57) ABSTRACT

A 4-point occupant restraint belt system for a vehicle seat having a seat bottom and a back rest. A one-piece belt is connected to the vehicle at upper and lower attachment points disposed adjacent a first side of the vehicle seat, and a buckle is disposed adjacent an opposite second side of the vehicle seat. A latch is slidingly mounted on the belt and engagable with the buckle to secure the belt around a seat occupant in a three-point configuration. A lifting arm has a lowered position wherein it is beneath the belt and adjacent the latch when the latch is engaged with the buckle, and the lifting arm is movable to a raised position wherein it raises a portion of the belt to a position adjacent the back rest above the buckle, thereby creating a 4th belt attachment point.

13 Claims, 2 Drawing Sheets

VEHICLE OCCUPANT RESTRAINT BELT SYSTEM

CROSS-REFERENCE TO RELATED APPLICATIONS

This application claims foreign priority benefits under 35 U.S.C. §119(a)-(d) to EP 08156159.9 filed May 14, 2008, which is hereby incorporated by reference in its entirety.

BACKGROUND

1. Technical Field

The present invention relates to an automotive vehicle occupant restraint belt system, and particularly a four-point occupant restraint belt system to protect a seat occupant during an angled collision.

2. Background Art

Most automotive vehicles are equipped with occupant restraint belt systems for preventing the occupant of a vehicle seat from being thrown out of the vehicle or being thrown around in the vehicle compartment in an uncontrolled manner in case of a collision or the like.

Most safety belt systems used in ordinary passenger cars are of the three-point type, where a single continuous belt is attached to the frame of the vehicle at two different levels on the same side of the seat (usually the outboard side) and has a slidably fitted latch, that is engagable with a buckle provided on the opposite side (usually the inboard side) of the seat to fasten the belt abound the occupant's body. A retractor is usually provided at one of the outboard attachment points for tightening around the occupant's body when the belt is buckled, and pulling the belt in to a retracted position when not in use.

This type of three-point safety belt system has been found to be effective for most types of collisions and it is furthermore easy to buckle and unbuckle, as the user only has to grab the latch, pull it across the chest and lap, and insert it in the buckle, whereby the belt will be arranged low over the lap and diagonally across the chest of the user.

If a vehicle should collide under an impact angle of about 45 between front and side of the vehicle or in roll-over situations, there is however a risk that a belted driver or passenger could slide out of the diagonal portion (also known as the shoulder belt portion) of a conventional three-point safety belt.

By providing a four-point seat belt system, this problem can be eliminated or at least reduced, as the four-point seat belt will hold the occupant better in the seat and also reduces the torque on the torso of the occupant. Most four-point systems are however less user friendly.

WO 2004/009411 A1 discloses a vehicle seat belt system of the four point type, having a first and a second seat belt, with a two part buckle, a first part of which is attached to the first seat belt, whereas the second part thereof is attached to the second seat belt. The first buckle part is held by a receptacle, and when an occupant fastens the seat belt, the second buckle part is seized and connected to the first buckle part, whereby the seat belt will be arranged in a position similar to that of a conventional three-point safety belt. The system also incorporates a first retractor connected to the first seat belt and a second retractor connected to the second seat belt. When the two buckle parts have been interconnected and the receptacle has been operated to release the buckle, the two retractors retract the first and second seat belts such that the buckle is moved to a position wherein the two seat belts will extend cross-wise over the center of the occupant's torso.

SUMMARY

According to the embodiment of the present invention disclosed herein, an occupant restraint belt system comprising a one-piece belt having an upper and a lower attachment point disposed adjacent a first side of a vehicle seat, and a buckle disposed adjacent a second side of the vehicle seat opposite the first side. A latch is slidingly mounted on the belt and engagable with the buckle to secure the belt around a seat occupant. A lifting arm has a lowered position wherein it is beneath the belt and adjacent the latch when the latch is engaged with the buckle, and the lifting arm is movable to a raised position wherein it raises a portion of the belt to a position adjacent the back rest above the buckle.

The system provides a user-friendly occupant restraint belt system that is as easy to handle as a conventional three-point vehicle seat belt system while still providing the advantages of a four-point vehicle seat belt system.

BRIEF DESCRIPTION OF THE DRAWINGS

Hereinafter the invention will be further described with reference to the accompanying drawings showing a non-limiting embodiment of a occupant restraint belt system according to the invention.

DETAILED DESCRIPTION

Figure 1:
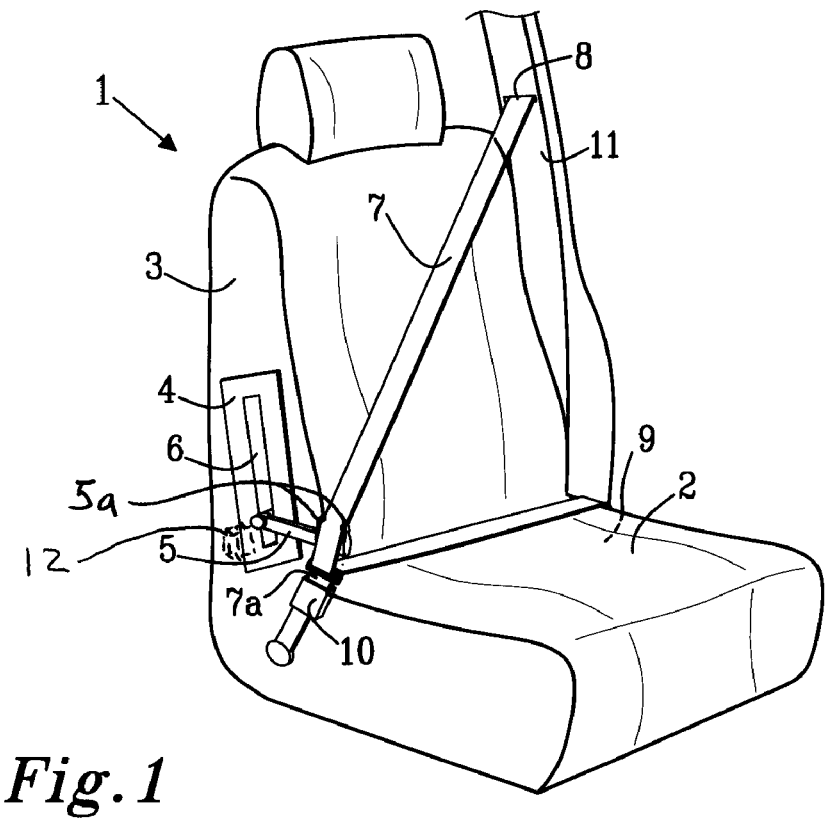
FIG. 1 is a perspective view showing schematically a vehicle seat safety belt according to an embodiment of the invention, with the occupant restraint belt coupled as a three-point safety belt.

FIG. 1 shows schematically a perspective view of a vehicle seat 1 comprising a generally horizontal seat bottom 2 and a generally upright back rest 3, and where there is provided a mechanism 4 forming part of the occupant restraint belt system according to an embodiment of the invention. The mechanism 4 incorporates a lifting arm 5, which is movable along a track 6 extending upwardly along the back rest 3. The lifting arm 5 can be movable along the track 6 by means of a motor 12 and related drive components, which are preferably hidden within the back rest 3. Alternatively, the lifting arm 5 may be manually operated by means of an appropriate link mechanism or the like.

In the position shown in FIG. 1, the occupant restraint belt 7 is attached to the vehicle at an upper attachment point 8 and a lower attachment point 9 both disposed adjacent the same side of the seat, most commonly the outboard side of the seat. A buckle 10 is disposed adjacent the side of the seat 1 opposite that of the upper and lower attachment points, and is approximately level with an upper surface of the seat bottom 2. A latch 7a is slidably attached to the belt 7 and is shown engaged with the buckle 10.

In the condition shown in FIG. 1, the belt 7 is arranged in generally the same configuration as a conventional three-point belt, with the portion extending between the buckle 10 and the upper attachment point 8 extending diagonally over the chest and the torso of a person being belted therein. This diagonal portion is commonly known as a shoulder belt, as distinct from the lap belt that extends between the lower attachment point 9 and the buckle 10.

When the latch 7a and buckle 10 are engaged with one another, a section of the shoulder belt immediately above the latch and buckle is positioned over and/or in contact with an upper surface of the lifting arm 5, which is in a lowered position so that it is close to the buckle 10. As shown in FIG. 1, the lifting arm 5 may have two upwardly projecting fingers 5a spaced from one another to form an opening slightly larger than the width of the belt 7, so that the belt is conveniently received in the opening when the latch 7a and buckle 10 are engaged with one another.

Figure 2:
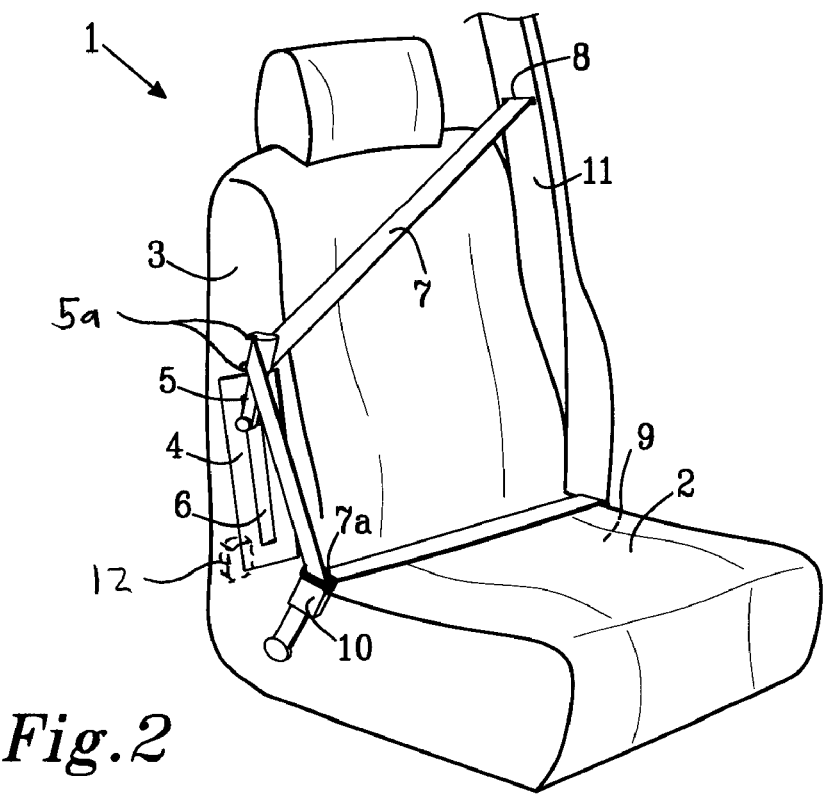
FIG. 2 is a view corresponding to FIG. 1, but with the occupant restraint belt in its position of use.

FIG. 2 shows the lifting arm 5 after being actuated (automatically or manually) to move upward along the track 6 to a raised position, thereby carrying along the inboard end of the shoulder belt portion of the belt 7, thus creating a fourth attachment point constituted by the lifting arm 5. The result is that the inboard end of the shoulder belt portion of the belt 7 is positioned higher across the chest of the seat occupant, thereby reducing the risk that the seat occupant may slide out from the belt 7 even during an angled collision.

As the lifting arm 5 moves upwardly to the raised position, the belt 7 slides over the upper surface of the lifting arm and remains between the lifting arm fingers 5a. The belt retractor (not shown) located at upper attachment point 8 may pay out an additional length of belt as required.

In the embodiment of the invention illustrated herein, movement of the lifting arm 5 between the lowered and raised positions comprises both a translational movement upwardly along track 6 and a rotational movement about the end of the lifting arm 5 that is engaged with the track. Depending on the exact motion of the lifting arm 5 that is required to achieve the desired positioning of the shoulder belt, however, both of these movements may not be necessary. Either a translational movement or a rotational movement alone may achieve the desired result of raising the inboard end of the shoulder belt, depending on the geometry of the seat 1 and the locations of the buckle 10 and attachment points 8, 9.

Figure 3:
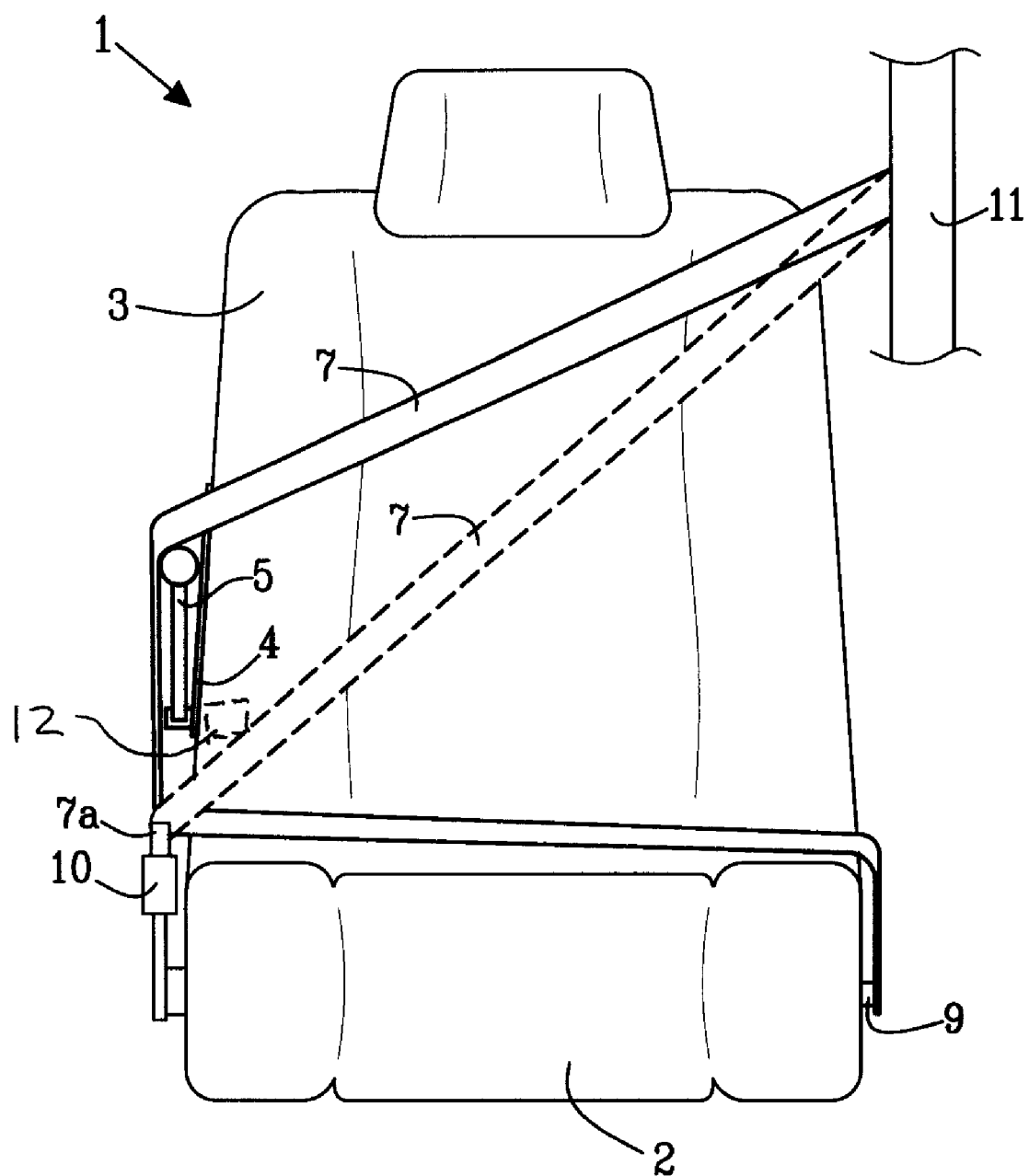
FIG. 3 shows in a front view the seat of FIGS. 1 and 2 with the occupant restraint belt system in an initial coupling position (broken lines) and with the occupant restraint belt coupled for use (solid lines).

In FIG. 3, the vehicle seat of FIG. 1 is shown in a front view, and in this view is also shown a single piece safety belt 7, being attached to the frame 11 of a vehicle at an upper point 8 at a level adjacent the top of the back rest 3 and positioned a short distance outboard of the back rest 3, and at a lower point 9 positioned adjacent the vehicle seat bottom 2 on the same side of the vehicle seat 1 as the upper point 8. Safety belt 7 may be engaged with a spool-type belt retractor (not shown) located adjacent to upper point 8. The safety belt 7 has a slidably connected latch 7a, which is arranged to be inserted into locking engagement with a buckle 10 on the side of the vehicle seat 1 opposite from the attachment points 8, 9.

To fasten the belt, a seat occupant first grasps the latch 7a and pulls the belt 7 across his/her body toward the side of the seat where the buckle 19 is located. The user inserts the latch 7 into engagement with the buckle 10, whereby the safety belt 7 comprises a lap portion extending over the upper surface of the seat bottom 2, which corresponds to a lap portion of a user occupying the vehicle seat 1, and a diagonally arranged shoulder belt portion (shown in broken lines). At this stage the belt 7 is arranged in a manner similar to that of a conventional three-point safety belt when buckled.

From this position the lifting arm 5 can be activated either automatically via a motorized or manual system to move upwards, thereby engaging the shoulder belt portion of the belt 7 at a point close to the latch 7a and buckle 10, and urging it to a position shown in solid lines, where the inboard end of the shoulder belt portion of the belt has been raised to a higher level, thus that it will be at a higher level relative to the chest of an occupant of the vehicle seat 1. As the lifting arm 5 moves upwardly to the raised position the belt 7 slides over the upper surface of the lifting arm, and the belt retractor (not shown) located at upper attachment point 8 may pay out the additional length of belt as required.

Therefore in this manner it has been designed a three-point safety belt, with an additional fourth attachment point provided by the movable lifting arm 5, whereby the handling of the occupant restraint belt according to the invention is as easy as the handling of a conventional three-point safety belt, but where the influence by the movable lifting arm 5 makes the belt take up a four point arrangement, with the chest part of the safety belt being positioned in a manner reducing the likelihood that the belted seat occupant will slide out of the shoulder belt part of the belt during angled collisions and the like.

While the best mode for carrying out the invention has been described in detail, those familiar with the art to which this invention relates will recognize various alternative designs and embodiments for practicing the invention as defined by the following claims.

What is claimed:

1. An occupant restraint belt system for a vehicle seat having a seat bottom and a back rest, the safety belt system comprising:
    a one-piece belt having an upper and a lower attachment point disposed adjacent a first side of the vehicle seat;
    a buckle disposed adjacent a second side of the vehicle seat opposite the first side;
    a latch slidingly mounted on the belt and engagable with the buckle to secure the belt around a seat occupant;
    a lifting arm having a lowered position wherein it is beneath the belt and adjacent the latch when the latch is engaged with the buckle, the lifting arm movable to a raised position wherein it raises a portion of the belt to a position adjacent the back rest above the buckle; and
    a motor actuatable automatically upon insertion of the latch into the buckle to move the lifting arm between the lowered and raised positions.

2. An occupant restraint belt system according to claim 1, wherein movement of the lifting arm between the lowered position and the raised position comprises translational movement upwardly along the back rest.

3. An occupant restraint belt system according to claim 1, wherein movement of the lifting arm between the lowered position and the raised position comprises rotational movement of the lifting arm about an end of the arm adjacent the seat back.

4. An occupant restraint belt system according to claim 1, wherein the lifting arm is lockable in the raised position.

5. An occupant restraint belt system according to claim 1, wherein the lifting arm comprises a pair of fingers spaced from one another to receive the belt therebetween.

6. A vehicle having an occupant restraint belt system associated with a seat having a seat bottom and a back rest, the safety belt system comprising:
    a seat belt having a first end attached to the vehicle at an upper attachment point adjacent an upper, outboard portion of the back rest, and a second end attached to the vehicle at a lower attachment point adjacent a lower outboard portion of the back rest;
    a buckle disposed adjacent an inboard portion of the seat bottom;
    a latch slidingly mounted on the seat belt and engagable with the buckle to divide the belt into a shoulder portion extending between the upper attachment point and the buckle and a lap portion extending between the lower attachment point and the buckle;

a lifting arm having a lowered position wherein it is disposed adjacent the latch when the latch is engaged with the buckle, the lifting arm movable to a raised position wherein it urges an inboard end of the shoulder portion upwardly to a position adjacent the back rest above the latch; and a motor actuatable automatically upon insertion of the latch into the buckle to move the lifting arm between the lowered and raised positions.

7. A vehicle according to claim 6, wherein movement of the lifting arm between the lowered position and the raised position comprises translational movement upwardly along the back rest.

8. A vehicle according to claim 6, wherein movement of the lifting arm between the lowered position and the raised position comprises rotational movement of the lifting arm about an end of the arm adjacent the seat back.

9. A vehicle according to claim 6, wherein the lifting arm is lockable in the raised position.

10. A vehicle according to claim 6, wherein the lifting arm comprises a pair of fingers spaced from one another to receive the belt therebetween.

11. A restraint belt system for a vehicle seat having a seat bottom and a back rest, the safety belt system comprising:

a seat belt having a first end attachable to the vehicle at an upper attachment point adjacent a first side of the seat and adjacent an upper end of the back rest, and a second end attachable to the vehicle at a lower attachment point adjacent the first side of the seat and adjacent the seat bottom;

a buckle disposed adjacent a second side of the seat opposite from the first side and adjacent the seat bottom;

a latch slidingly mounted on the seat belt and engagable with the buckle to divide the belt into a shoulder portion extending between the upper attachment point and the buckle and a lap portion extending between the lower attachment point and the buckle;

a lifting arm having a lowered position wherein it is disposed adjacent the latch when the latch is engaged with the buckle, the lifting arm movable to a raised position wherein it urges an end of the shoulder portion upwardly to a position adjacent the back rest above the latch; and a motor actuatable automatically upon insertion of the latch into the buckle to move the lifting arm between the lowered and raised positions.

12. A vehicle according to claim 11, wherein movement of the lifting arm between the lowered position and the raised position comprises translational movement upwardly along the back rest.

13. A vehicle according to claim 11, wherein movement of the lifting arm between the lowered position and the raised position comprises rotational movement of the lifting arm about an end of the arm adjacent the seat back.

* * * * *